G. M. PATTEN.

Making Clinch Rings.

No. 2,444. Reissued Jan. 1, 1867.

N. PETERS, Photo-Lithographer, Washington, D. C.

United States Patent Office.

G. M. PATTEN, OF BATH, MAINE.

*Letters Patent No.* 10,864, *dated May* 2, 1854; *reissue No.* 2,444, *dated January* 1, 1867.

IMPROVED MACHINE FOR MAKING CLINCH RINGS.

The Schedule referred to in these Letters Patent and making part of the same.

TO ALL WHOM IT MAY CONCERN:

Be it known that I, G. M. PATTEN, of Bath, in the county of Lincoln, and State of Maine, have invented a new and useful improvement in the Machine for Forming and Punching Clinch Rings, or other articles of like character, from a plate of metal; and I do hereby declare that the following is a full, clear, and exact description of the same, reference being had to the accompanying drawings, forming part of this specification, in which—

Similar letters of reference in each of the several figures indicate corresponding parts.

This invention relates to a new and useful improvement in machinery for forming and punching clinch rings, which are generally used as washers in ship building.

To enable others skilled in the art to make and use my invention, I will proceed to describe its construction and operation.

Figure 3:
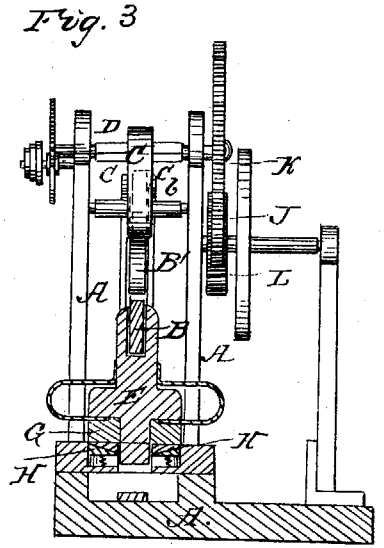
Figure 3 is a vertical transverse section, such section being taken through the dies.
Figure 1:
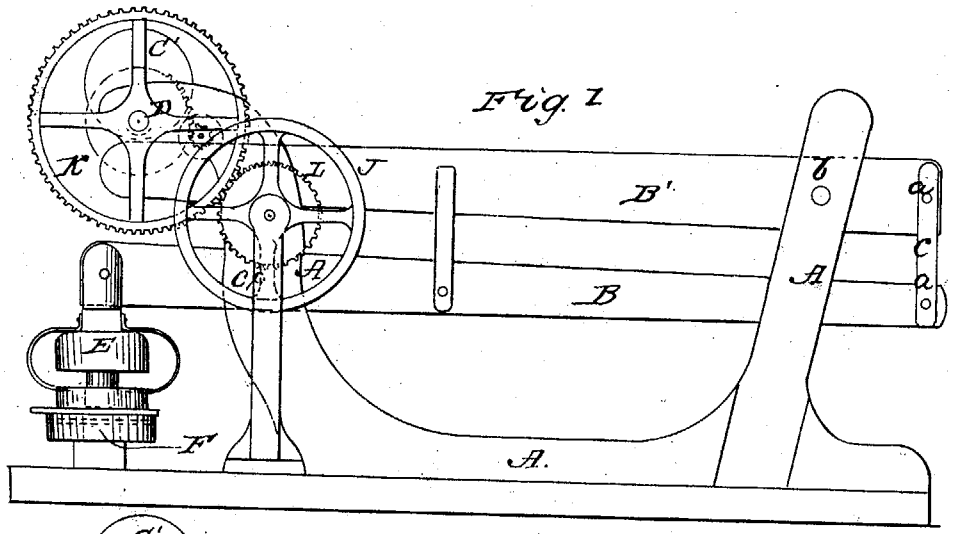
Figure 1 is an external side elevation of my improved machine as ready to commence operating.
Figure 2:
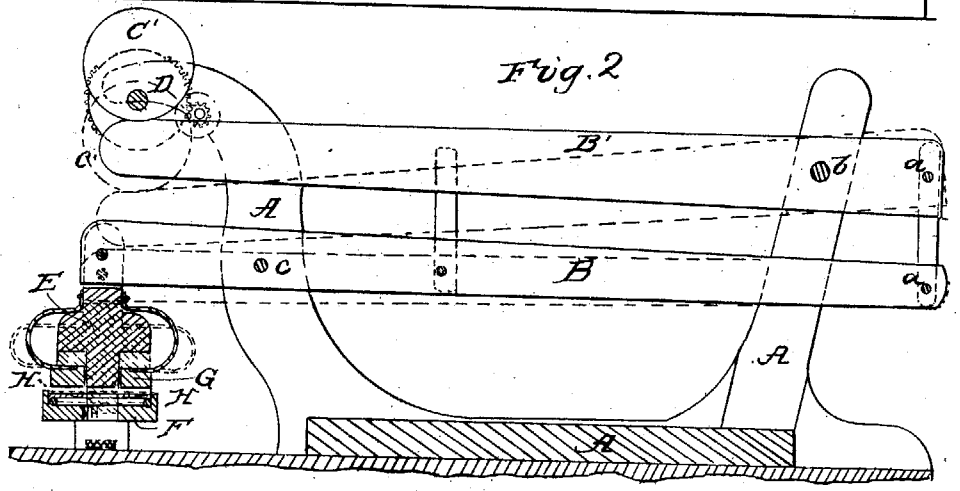
Figure 2 is a vertical longitudinal section of the same, it being shown in red as it appears when in operation, and in black as it appears after the ring has been formed, punched, and discharged.

A represents the cast-iron frame of the machine. It may be constructed after the plan shown in the drawing, or any other more suitable. B B′ are two levers, connected together at their extreme back ends by the strips C C. The pins *a a*, which secure the links *c* to the levers, pass loosely through the levers in order that the rear parts of said levers may adjust themselves to the movement of the forward portions of the levers. The upper lever B′ has a fulcrum at *b* in back standards of the frame A, as shown in figs. 1, 2, and 3, and the lower lever B has a fulcrum at $C^2$ in the front standards of the frame A. $C^1$ is a cam, arranged on the driving-shaft D, which is hung in the top of the front standards of the frame A. This cam serves to give action to the levers, it being arranged so as to bear upon the front arm of the top lever B′. By thus arranging the levers great power can be secured at the point desired. E is the top die, and F is the lower die, which are made of such shape that they, in combination, will produce a clinch ring of the form desired. These dies are arranged so that they may be removed, and others of smaller or larger size substituted for them. G is the sliding or spring collar or plate retainer, which not only operates to retain the plate or hold it in place on the die preparatory to and while the punch may be passing through the plate, but allows of the punch passing into the lower die, as shown in red lines in fig. 2, and black lines in fig. 3, and then, as the punch is withdrawn from the lower die, with the ring hanging to it, serves to disconnect said ring from the upper die, and cause it to fall upon the elastic seat of the lower die. H is the elastic seat of the lower die. Such seat consists of a plate supported on a spring. It is arranged within the die, and it serves for preventing the ring after being finished from falling into the chamber of the lower die. The said seat moves up even with the top of the lower die when the punch is withdrawn, and thereby elevates the clinch ring, or article formed by the dies, up to a level with the top of the lower die, in order that such ring or article may be pushed from the dies by the bar or plate when next advanced between them. The seat performs the above-mentioned function, and as the ring falls from the punch or upper die, catches it and prevents it falling into the female die, and holds it thus until the bar is fed in to form another ring, and the upper die descends upon the bar or plate, when it yields and allows the metal to be forced into the chamber of the lower die. It should be remembered that the end of the bar discharges the finished ring. If this ring is not thus prevented from falling into the lower die there is danger of the discharge of the ring not being readily effected, and consequently the machine is liable to be broken. This machine may be set in action by gearing similar to that represented if found advisable, which consists of a driving-pulley, J, spur-wheel, K, and pinion, L.

The operation is as follows: The machine is set in motion and the bar fed in the required distance, as shown in fig. 1. The cam forces the end of the lever B down to the position shown in red in fig. 2, and thereby causes the back end of the lever B′ to rise, and consequently its front end, to which the die is attached, to descend, as shown in red lines, and to exert sufficient pressure to cause the dies to punch and form the die ring. The cam continues to revolve, and allows the levers to rise. As this takes place the finished ring is drawn out of the lower die by the upper die, and is disconnected from said die by the sliding spring-collar G, and falls upon the elastic seat of the lower die, which prevents it passing into the chamber of said die. The ring thus finished is discharged as the bar is fed in to form another ring, said discharge being effected by the bar itself. By the specified arrangement and operation of the spring-clearer G, extending around the punch or top die, in combination with the elastic lower die, it will be observed that the clinch ring as formed is restrained from all possibility of falling or resting only partially in the lower die, or of tipping upwards on the one side, partially out of the lower die, as liable to be caused by shake, slight deviation from the vertical position in the lift of the punch, or by the clinch ring slipping freer and sooner off the one side of the punch than the other, and by such displacement of the ring should the punch again descend before the ring is cleared from the machine would be liable to cause breakage of some of the parts of the machine. This liability by my arrangement is obviated, as the clearer G, which has a broad bearing surface over the entire top of the clinch ring, always exerts a tendency, by the spring pressing it downwards, both during the up and down stroke of the punch, to detach or clear off the clinch ring from the punch, and to hold or keep the ring steady in its seat in the lower die, but still not to hold it so hard or grip it that any difficulty will be felt in removing it by the feed of the bar forwards to make another ring, as specified; the grip of the clinch ring, when made between the top and bottom dies, being that of two elastic cushions, as if it were. In feeding in the bar it will be observed that the clearer G by its position will act as an elastic guide to the introduction of the bar, and will readily give or yield to any inequality in the thickness of the bar, so as to insure an easy feed, but at the same time will press the bar down flat on its bearing or bed, and restrain the forward end from turning or jumping, as is apt to be the case in feeding by hand, so that the punch cannot fail to strike the bar flat or "fair," as it is termed, which is better for the punch, and makes a "cleaner" ring. The clearer also, by bearing down on the bar during the punching of the ring, steadies it and facilitates the operation. And thus the springing lower die and clearer, acting in concert in the manner described, forming a soft but sufficient double grip and elastic guide to the bar, forms an arrangement having many practicable important advantages in the manufacture of clinch rings.

I am aware that a lower die having a spring seat for discharging the manufactured article has before been used; also that a spring-clearer differently arranged or operating in combination has been employed in various eyelet machines for removing the eyelets from the punch or upper dies as it ascends; such, therefore, I do not claim. But what I do claim as new and useful, and desire to secure by Letters Patent, is—

The combination of the retainer and clearer or part G, and its springs, or the equivalent thereof, and the elastic seat H, with the dies E and F; the upper die being provided with mechanism for operating it, as described.

I also claim the combination, as well as the arrangement, of the retainer or part G, and its springs or their equivalent, with a punch and die or dies, E F, the said part G being to operate therewith, substantially as described.

G. M. PATTEN.

Witnesses:
C. W. LARRABEE,
J. P. HITCHCOCK.